(12) United States Patent  
Ikeda et al.

(10) Patent No.: US 10,263,543 B2  
(45) Date of Patent: Apr. 16, 2019

(54) ELECTRIC TOOL SYSTEM

(71) Applicant: PANASONIC INTELLECTUAL PROPERTY MANAGEMENT CO., LTD., Osaka (JP)

(72) Inventors: Masaki Ikeda, Mie (JP); Naoki Tsuruta, Mie (JP); Akira Kawai, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/554,995

(22) PCT Filed: Mar. 4, 2016

(86) PCT No.: PCT/JP2016/001214  
§ 371 (c)(1),  
(2) Date: Aug. 31, 2017

(87) PCT Pub. No.: WO2016/143321  
PCT Pub. Date: Sep. 15, 2016

(65) Prior Publication Data  
US 2018/0048249 A1  Feb. 15, 2018

(30) Foreign Application Priority Data  
Mar. 11, 2015  (JP) ................... 2015-048315

(51) Int. Cl.  
*B25F 5/02* (2006.01)  
*H02J 7/00* (2006.01)  
(Continued)

(52) U.S. Cl.  
CPC ............... *H02P 1/022* (2013.01); *B25F 5/02* (2013.01); *G06F 21/44* (2013.01); *H02J 7/0004* (2013.01);  
(Continued)

(58) Field of Classification Search  
CPC .................... H02P 1/022; H02J 7/0029  
(Continued)

(56) References Cited

U.S. PATENT DOCUMENTS 6,119,074 A * 9/2000 Sarangapani ...... G05B 23/0232  
701/1  
8,294,403 B2 * 10/2012 Haas .................... G05B 19/406  
318/473  
(Continued)

FOREIGN PATENT DOCUMENTS

EP  2 777 890 A1  9/2014  
JP  2011-201005 A  10/2011  
(Continued)

OTHER PUBLICATIONS

Extended European Search Report issued in corresponding European Patent Application No. 16761295.1, dated Dec. 8, 2017.  
(Continued)

*Primary Examiner* — David Luo  
(74) *Attorney, Agent, or Firm* — McDermott Will & Emery LLP

(57) ABSTRACT

A power tool system includes a battery pack, a charger connectable to the battery pack, and a power tool body connectable to the battery pack. The battery pack includes a battery pack memory that stores identification information in a smallest unit allowing for communication with the charger and the power tool body. Each of the charger and the power tool body includes a device memory that stores at least one piece of identification information of a usable battery pack. Each of the charger and the power tool body or the battery pack includes a determination unit that determines whether or not the at least one piece of identification information stored in the device memory includes the identification information stored in the battery pack memory.

5 Claims, 2 Drawing Sheets

(51) Int. Cl.
*H02P 1/02* (2006.01)
*G06F 21/44* (2013.01)

(52) U.S. Cl.
CPC ..... *H02J 7/0029* (2013.01); *H02J 2007/0001* (2013.01); *H02J 2007/0098* (2013.01)

(58) Field of Classification Search
USPC .................................................. 318/139, 34
See application file for complete search history.

(56) References Cited

U.S. PATENT DOCUMENTS

| | | |
|---|---|---|
| 2005/0048359 A1 | 3/2005 | Yamada et al. |
| 2010/0141207 A1 | 6/2010 | Phillips et al. |
| 2011/0163701 A1 | 7/2011 | Carrier et al. |
| 2014/0158389 A1* | 6/2014 | Ito ............................ B25F 5/00 173/46 |

FOREIGN PATENT DOCUMENTS

| | | |
|---|---|---|
| JP | 2012-104039 A | 5/2012 |
| JP | 2014-172151 A | 9/2014 |
| JP | 2014-525842 A | 10/2014 |

OTHER PUBLICATIONS

English translation of the International Preliminary Report on Patentability issued in International Patent Application No. PCT/JP2016/001214, dated Sep. 12, 2017.

International Search Report and Written Opinion issued in International Patent Application No. PCT/JP2016/001214, dated May 24, 2016; with partial English translation.

* cited by examiner

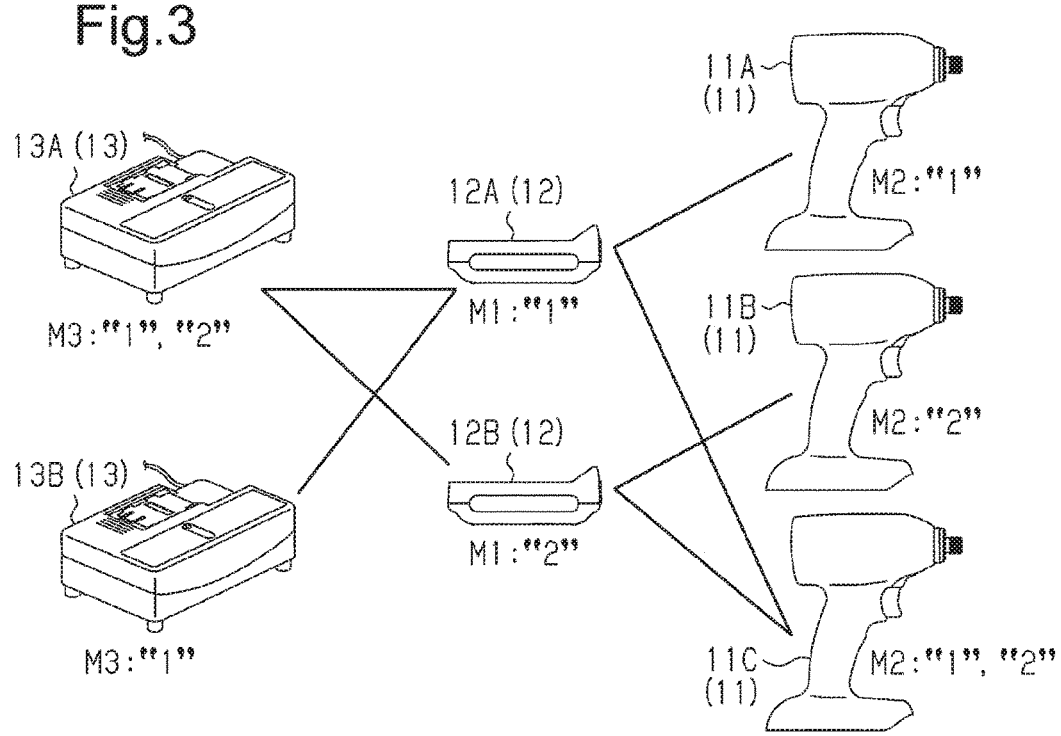

ELECTRIC TOOL SYSTEM

RELATED APPLICATIONS

This application is the U.S. National Phase under 35 U.S.C. § 371 of International Patent Application No. PCT/JP2016/001214, filed on Mar. 4, 2016, which in turn claims the benefit of Japanese Application No. 2015-048315, filed on Mar. 11, 2015, the entire disclosures of which Applications are incorporated by reference herein.

TECHNICAL FIELD

The present invention relates to a power tool system.

BACKGROUND ART

Patent document 1 describes a power tool system that determines whether or not a battery pack can be used in a power tool body based on information of the rated capacity and information of the rated output voltage of the battery pack stored in a memory of the battery pack.

PRIOR ART DOCUMENT

Patent Document

Patent Document 1: Japanese Laid-Open Patent Publication No. 2011-201005

SUMMARY OF THE INVENTION

Problems that are to be Solved by the Invention

Such a power tool system determines whether or not the battery pack can be used in the power tool body based on the two pieces of information, namely, the information of the rated capacity and the information of the rated output voltage of the battery pack. Thus, the determination may require time.

Further, for example, a power tool system that charges the battery pack with a charger may determine whether or not charging can be performed between the battery pack and the charger (whether or not the battery pack is usable). In such a case, it is also desirable that the determination time be shortened.

It is an object of the present invention to provide a power tool system capable of further quickly determining whether or not a battery pack can be used.

Means for Solving the Problem

A first aspect of the present invention is a power tool system. The power tool system includes a battery pack, a charger connectable to the battery pack, and a power tool body connectable to the battery pack. The battery pack includes a battery pack memory that stores identification information in a smallest unit allowing for communication with the charger and the power tool body. Each of the charger and the power tool body includes a device memory that stores at least one piece of identification information of a usable battery pack. Each of the charger and the power tool body or the battery pack includes a determination unit that determines whether or not the at least one piece of identification information stored in the device memory includes the identification information stored in the battery pack memory.

Effect of the Invention

The power tool system of the present invention is capable of further quickly determining whether or not a battery pack can be used.

BRIEF DESCRIPTION OF THE DRAWINGS

FIG. 3 is a diagram showing the compatibility of a power tool body and a battery pack and the compatibility of a charger and the battery pack in the power tool system of the embodiment.

EMBODIMENTS OF THE INVENTION

One embodiment of a power tool system will now be described with reference to the drawings.

Figure 1:
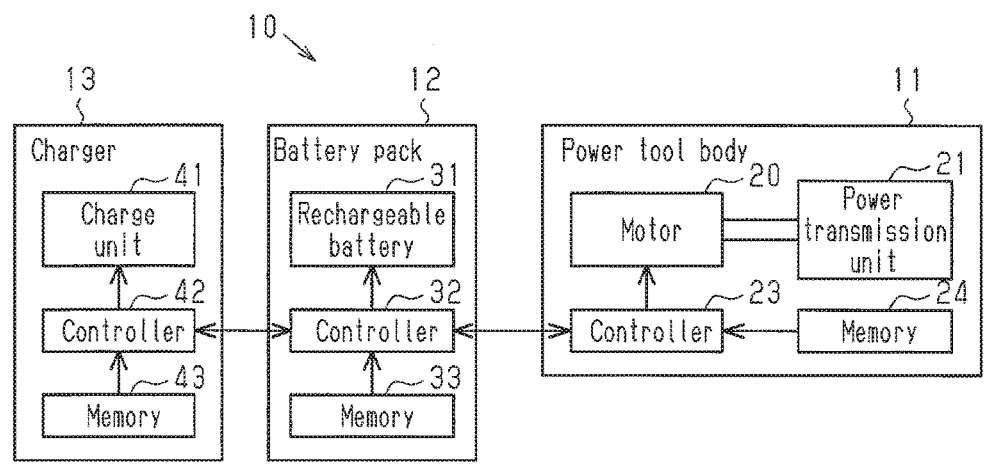
FIG. 1 is a schematic block diagram showing the configuration of one embodiment of a power tool system.

As shown in FIG. 1, the power tool system includes a power tool 10 and a charger 13. The power tool 10 includes a power tool body 11 and a battery pack 12. The charger 13 charges the battery pack 12.

Figure 2:
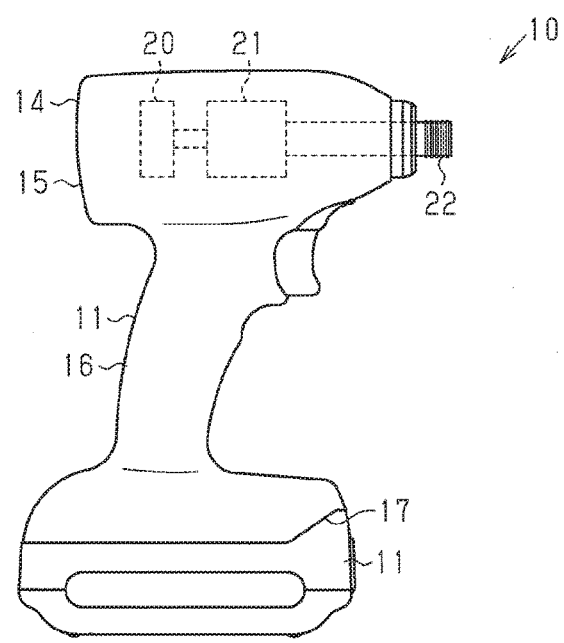
FIG. 2 is a side view showing a power tool of the embodiment.

As shown in FIG. 2, a housing 14 that forms the shell of the power tool body 11 includes a tubular barrel 15 and a handle 16 extending downwardly from the barrel 15 at a middle portion with respect to a front-to-rear direction (longitudinal direction). A battery pack seat 17, to which the battery pack 12 is attached, is arranged at the lower side of the handle 16.

The barrel 15 of the housing 14 includes a motor 20 and a power transmission unit 21, which includes a reduction drive driven by and coupled to the motor 20. A bit attaching portion 22 is connected to a distal end of the power transmission unit 21. Various bits (not shown) are attached to the bit attaching portion 22. This allows the power transmission unit 21 to transmit the rotation drive force of the motor 20 to the bits.

As shown in FIG. 1, the power tool body 11 includes a controller 23 that controls the rotation produced by the motor 20 and a memory 24 that stores various types of setting information. The memory 24 stores, for example, identification information M2 of the battery pack 12 that is compatible. The identification information M2 stored in the memory 24 includes identification information M1 of one or more battery packs 12. For example, when the power tool body 11 corresponds to only one type of battery pack 12, only one piece of identification information M1 is stored in advance in the memory 24 as the identification information M2. When the power tool body 11 corresponds to multiple types of battery packs 12, multiple pieces of identification information M1 having different contents are stored in advance in the memory 24 as the identification information M2.

As shown in FIG. 2, the battery pack 12 is configured so that it can be coupled (connected) to the battery pack seat 17 of the power tool body 11.

As shown in FIG. 1, the battery pack 12 includes a rechargeable battery 31 including one or more cells, a controller 32 that controls charging and power supplying of the rechargeable battery 31, and a memory 33 that stores various types of setting information. The memory 33 functions as a battery pack memory.

The identification information M1 is stored in advance in the memory 33 of the battery pack 12. The identification information M1 is used to determine whether or not the battery pack 12 is compatible with the power tool body 11 or the charger 13 when the battery pack 12 is connected to the power tool body 11 or the charger 13. For example, the identification information M1 is stored in the smallest unit allowing for communication. The identification information M1 may have data size of the smallest unit (one nibble=four bits) when communication is established. This allows a maximum of sixteen types of identification information M1 to be set. The identification information M1 may include an identification number that identifies the battery pack 12.

As shown in FIG. 1, the charger 13 includes a charging unit 41 that charges the rechargeable battery 31 of the battery pack 12, a controller 42 that controls the charging unit 41, and a memory 43 that stores various types of setting information.

The memory 43 of the charger 13 stores, for example, identification information M3 of the battery pack 12 that is compatible. The identification information M3 stored in the memory 43 includes the identification information M1 of one or more battery packs 12. For example, when the charger 13 only corresponds to one type of battery pack 12, only one piece of identification information M1 is stored in advance in the memory 24 as the identification information M3. When the charger 13 corresponds to multiple types of battery packs 12, multiple pieces of identification information M1 having different contents are stored in advance in the memory 24 as the identification information M3.

The power tool system uses the identification information M1, the identification information M2, and the identification information M3 to determine whether or not the power tool body 11 is compatible with the battery pack 12 and the charger 13 is compatible with the battery pack 12. The compatibility determination of the power tool body 11 and the battery pack 12 and the compatibility determination of the charger 13 and the battery pack 12 will now be described mainly with reference to FIGS. 1 and 3. The compatibility of the power tool system shown in FIG. 3 will now be described using three power tool bodies 11, two battery packs 12, and two chargers 13. To facilitate understanding, the three power tool bodies 11 are distinguished from one another as a power tool body 11A, a power tool body 11B, and a power tool body 11C using different reference characters. In the same manner, to facilitate understanding, the two battery packs 12 are distinguished from one another as a battery pack 12A and a battery pack 12B using different reference characters. Further, to facilitate understanding, the two chargers 13 are distinguished from one another as a charger 13A and a charger 13B using different reference characters.

As shown in FIG. 3, the power tool body 11A stores only "1" as the identification information M2. The power tool body 11B stores only "2" as the identification information M2. The power tool body 11C stores "1" and "2" as the identification information M2.

As shown in FIG. 3, the battery pack 12A stores only "1" as the identification information M1. The battery pack 12B stores only "2" as the identification information M1.

As shown in FIG. 3, the charger 13A stores "1" and "2" as the identification information M3. The charger 13B stores only "1" as the identification information M1.

Compatibility Determination of Power Tool Body 11A and Battery Pack 12A

As shown in FIGS. 1 and 3, when the battery pack 12A is attached to the power tool body 11A, the controller 23 of the power tool body 11A reads the identification information M1 ("1"), which is set to the battery pack 12A, from the memory 33 of the battery pack 12A via the controller 32. The controller 32 of the power tool body 11A compares the identification information M1 and the identification information M2 ("1"), which is stored in the memory 24 of the power tool body 11A, and determines whether or not the power tool body 11A is compatible with the battery pack 12A. The identification information M1 set to the battery pack 12A is "1," and the identification information M2 set to the power tool body 11A is "1." Thus, the controller 32 determines that the power tool body 11A is compatible with the battery pack 12A. Accordingly, the controller 32 permits the supply of power from the battery pack 12A to the power tool body 11A.

Compatibility Determination of Power Tool Body 11A and Battery Pack 12B

As shown in FIGS. 1 and 3, when the battery pack 12B is attached to the power tool body 11A, the controller 23 of the power tool body 11A reads the identification information M1 ("2"), which is set to the battery pack 12B, from the memory 33 of the battery pack 12B via the controller 32. The controller 32 of the power tool body 11A compares the identification information M1 and the identification information M2 ("1"), which is stored in the memory 24 of the power tool body 11A, and determines whether or not the power tool body 11A is compatible with the battery pack 12B. The identification information M1 set to the battery pack 12B is "2," and the identification information M2 set to the power tool body 11A is "1." Thus, the controller 32 determines that the power tool body 11A is not compatible with the battery pack 12B. Accordingly, the controller 32 is configured not to permit the supply of power from the battery pack 12B to the power tool body 11A.

Compatibility Determination of Power Tool Body 11B and Battery Pack 12A

As shown in FIGS. 1 and 3, when the battery pack 12A is attached to the power tool body 11B, the controller 23 of the power tool body 11B reads the identification information M1 ("1"), which is set to the battery pack 12A, from the memory 33 of the battery pack 12A via the controller 32. The controller 32 of the power tool body 11B compares the identification information M1 and the identification information M2 ("2"), which is stored in the memory 24 of the power tool body 11B, and determines whether or not the power tool body 11B is compatible with the battery pack 12A. The identification information M1 set to the battery pack 12A is "1," and the identification information M2 set to the power tool body 11B is "2." Thus, the controller 32 determines that the power tool body 11A is not compatible with the battery pack 12A. Accordingly, the controller 32 is configured not to permit the supply of power from the battery pack 12A to the power tool body 11B.

Compatibility Determination of Power Tool Body 11B and Battery Pack 12B

As shown in FIGS. 1 and 3, when the battery pack 12B is attached to the power tool body 11B, the controller 23 of the power tool body 11B reads the identification information M1 ("2"), which is set to the battery pack 12B, from the memory 33 of the battery pack 12B via the controller 32. The controller 32 of the power tool body 11B compares the identification information M1 and the identification information M2 ("2"), which is stored in the memory 24 of the power tool body 11B, and determines whether or not the power tool body 11B is compatible with the battery pack 12B. The identification information M1 set to the battery pack 12B is "2," and the identification information M2 set to the power tool body 11B is "2." Thus, the controller 32 determines that the power tool body 11B is compatible with the battery pack 12B. Accordingly, the controller 32 permits the supply of power from the battery pack 12B to the power tool body 11B.

Compatibility Determination of Power Tool Body 11C and Battery Pack 12A

As shown in FIGS. 1 and 3, when the battery pack 12A is attached to the power tool body 11C, the controller 23 of the power tool body 11C reads the identification information M1 ("1"), which is set to the battery pack 12A, from the memory 33 of the battery pack 12A via the controller 32. The controller 32 of the power tool body 11C compares the identification information M1 and the identification information M2 ("1" and "2"), which is stored in the memory 24 of the power tool body 11C, and determines whether or not the power tool body 11C is compatible with the battery pack 12A. The identification information M1 set to the battery pack 12A is "1," and the identification information M2 set to the power tool body 11C is "1" and "2." That is, since the identification information M2 includes the identification information M1, the controller 32 determines that the power tool body 11C is compatible with the battery pack 12A. Accordingly, the controller 32 permits the supply of power from the battery pack 12A to the power tool body 11C.

Compatibility Determination of Power Tool Body 11C and Battery Pack 12B

As shown in FIGS. 1 and 3, when the battery pack 12B is attached to the power tool body 11C, the controller 23 of the power tool body 11C reads the identification information M1 ("2"), which is set to the battery pack 12B, from the memory 33 of the battery pack 12B via the controller 32. The controller 32 of the power tool body 11C compares the identification information M1 and the identification information M2 ("1" and "2"), which is stored in the memory 24 of the power tool body 11C, and determines whether or not the power tool body 11C is compatible with the battery pack 12B. The identification information M1 set to the battery pack 12B is "2," and the identification information M2 set to the power tool body 11C is "1" and "2." That is, since the identification information M2 includes the identification information M1, the controller 32 determines that the power tool body 11C is compatible with the battery pack 12B. Accordingly, the controller 32 permits the supply of power from the battery pack 12B to the power tool body 11C.

Compatibility Determination of Charger 13A and Battery Pack 12A

As shown in FIGS. 1 and 3, when the battery pack 12A is attached to the charger 13A, the controller 42 of the charger 13A reads the identification information M1 ("1"), which is set to the battery pack 12A, from the memory 33 of the battery pack 12A via the controller 32. The controller 42 of the charger 13A compares the identification information M1 and the identification information M3 ("1" and "2"), which is stored in the memory 43 of the charger 13A, and determines whether or not the charger 13A is compatible with the battery pack 12A. The identification information M1 set to the battery pack 12A is "1," and the identification information M3 set to the charger 13A is "1" and "2." That is, the identification information M3 includes the identification information M1. Thus, the controller 42 determines that the charger 13A is compatible with the battery pack 12A. Accordingly, the controller 42 permits charging from the charger 13A to the battery pack 12A.

Compatibility Determination of Charger 13A and Battery Pack 12B

As shown in FIGS. 1 and 3, when the battery pack 12B is attached to the charger 13A, the controller 42 of the charger 13A reads the identification information M1 ("2"), which is set to the battery pack 12B, from the memory 33 of the battery pack 12B via the controller 32. The controller 42 of the charger 13A compares the identification information M1 and the identification information M3 ("1" and "2"), which is stored in the memory 43 of the charger 13A, and determines whether or not the charger 13A is compatible with the battery pack 12B. The identification information M1 set to the battery pack 12B is "1," and the identification information M3 set to the charger 13A is "1" and "2." That is, the identification information M3 includes the identification information M1. Thus, the controller 42 determines that the charger 13A is compatible with the battery pack 12B. Accordingly, the controller 42 permits charging from the charger 13A to the battery pack 12B.

Compatibility Determination of Charger 13B and Battery Pack 12A

As shown in FIGS. 1 and 3, when the battery pack 12A is attached to the charger 13B, the controller 42 of the charger 13B reads the identification information M1 ("1"), which is set to the battery pack 12A, from the memory 33 of the battery pack 12A via the controller 32. The controller 42 of the charger 13B compares the identification information M1 and the identification information M3 ("1" and "2"), which is stored in the memory 43 of the charger 13B, and determines whether or not the charger 13B is compatible with the battery pack 12A. The identification information M1 set to the battery pack 12A is "1," and the identification information M3 set to the charger 13B is "1." Thus, the controller 42 determines that the charger 13B is compatible with the battery pack 12A. Accordingly, the controller 42 permits charging from the charger 13B to the battery pack 12A.

Compatibility Determination of Charger 13B and Battery Pack 12B

As shown in FIGS. 1 and 3, when the battery pack 12B is attached to the charger 13B, the controller 42 of the charger 13B reads the identification information M1 ("2"), which is set to the battery pack 12B, from the memory 33 of the battery pack 12B via the controller 32. The controller 42 of the charger 13B compares the identification information M1 and the identification information M3 ("1"), which is stored in the memory 43 of the charger 13B, and determines whether or not the charger 13B is compatible with the battery pack 12B. The identification information M1 set to the battery pack 12B is "2," and the identification information M3 set to the charger 13B is "1." Thus, the controller 42 determines that the charger 13B is not compatible with the battery pack 12B. Accordingly, the controller 42 is configured not to permit charging from the charger 13B to the battery pack 12B.

The present embodiment has the advantages described below.

(1) The battery pack 12 includes the memory 33 that stores the identification information M1 in the smallest unit in which communication can be established with the power tool body 11 and the charger 13, and the power tool body 11 and the charger 13 respectively include the memories 24 and 43 that store the identification information M2 and the identification information M3 of the usable battery pack 12 in advance. The power tool body 11 and the charger 13 respectively include the controllers 23 and 42 functioning as determination units that determine whether or not the identification information M1 stored in the memory 33 corresponds to the identification information M2 and the identification information M3 stored in the memories 24 and 43. In this manner, the identification information M1 in the smallest unit allowing for communication is used to determine the compatibility of the battery pack 12 and the power tool body 11 and the compatibility of the battery pack 12 and the charger 13. This minimizes the data required to perform compatibility determination and allows for quicker compatibility determination.

(2) The charger 13 includes the controller 42 functioning as a charging permission unit that permits charging of the battery pack 12 when determining that the identification information M1 stored in the memory 33 corresponds to the identification information M3 stored in the memory 43. After checking the compatibility of the battery pack 12 and the charger 13 in this manner, charging is quickly permitted to quickly start charging. As a result, charging can be completed quickly.

(3) The power tool body 11 includes the controller 23 functioning as a power supplying permission unit that permits the supply of power to the power tool body 11 when determining that the identification information M1 stored in the memory 33 corresponds to the identification information M2 stored in the memory 24 of the power tool body 11. After checking the compatibility of the battery pack 12 and the power tool body 11 in this manner, the supply of power is quickly permitted to quickly start the supply of power to the motor 20. This allows a user to quickly start a task.

The above embodiment may be modified as described below.

In the above embodiment, the controller 42 of the charger 13 functions as a charging permission unit. Instead, the controller 32 of the charger 13 may function as a charging permission unit.

In the above embodiment, the controller 23 of the power tool body 11 functions as a power supplying permission unit. Instead, the controller 32 of the power tool body 11 may function as a power supplying permission unit.

In the above embodiment, the controller 23 of the power tool body 11 functions as a determination unit that determines the compatibility of the power tool body 11 and the battery pack 12. Instead, the controller 32 of the battery pack 12 may function as a determination unit that determines the compatibility of the power tool body 11 and the battery pack 12.

In the above embodiment, the controller 42 of the charger 13 functions as a determination unit that determines the compatibility of the charger 13 and the battery pack 12. Instead, the controller 32 of the battery pack 12 may function as a determination unit that determines the compatibility of the charger 13 and the battery pack 12.

Although not particularly mentioned in the above embodiment, when the battery pack to which the identification information M1 is set is attached to a conventional power tool body to which the identification information M2 is not set and a conventional charger to which the identification information M3 is not set, the power tool body and the charger cannot identify the battery pack. In this case, the conventional power tool body and the conventional charger are configured so as not to charge the battery pack and not to supply power from the battery pack.

Further, when a conventional battery pack to which the identification information M1 is not set is attached to the power tool body to which the identification information M2 is set and the charger to which the identification information M3 is set, the power tool body or the charger cannot identify the battery pack. The power tool body to which the identification information M2 is set and the charger to which the identification information M3 is set may be configured so as not to charge the battery pack and not to supply power from the battery pack.

The embodiment and each of the modified examples may be combined.

The technical concept that can be understood from the embodiment and the modified examples will now be described.

Embodiment 1

A power tool system includes a battery pack (12), a charger (13) connectable to the battery pack, and a power tool body (11) connectable to the battery pack (12). The battery pack includes a battery pack memory (33) that stores identification information in a smallest unit allowing for communication with the charger (13) and the power tool body (11). Each of the charger (13) and the power tool body (11) includes a device memory (24, 43) that stores identification information of at least one usable battery pack. Each of the charger (13) and the power tool body (11) or the battery pack (12) includes a determination unit (23, 32, 42) that determines whether or not the at least one piece of identification information stored in the device memory (24, 43) includes the identification information stored in the battery pack memory (33).

Embodiment 2

In the power tool system according to embodiment 1, the charger (13) includes a power supplying permission unit (42) that permits charging of the power tool body (12) when the determination unit (32, 42) determines that the at least one piece of identification information stored in the device memory (43) of the charger (13) includes the identification information stored in the battery pack memory (33).

Embodiment 3

In the power tool system according to embodiment 1, the battery pack (12) includes a charging permission unit (32) that permits charging of the battery pack (12) when the determination unit (32, 42) determines that the at least one piece of identification information stored in the device memory (43) of the charger (13) includes the identification information stored in the battery pack memory (33).

Embodiment 4

In the power tool system according to any one of embodiments 1 to 3, the power tool body (11) includes a power supplying permission unit (23) that permits the power tool body (11) to be supplied when the determination unit (23) determines that the at least one piece of identification information stored in the device memory (24) of the power tool body (11) includes the identification information stored in the battery pack memory (33).

Embodiment 5

In the power tool system according to any one of embodiments 1 to 3, the battery pack (12) includes a power supplying permission unit (32) that permits the power tool body (11) to be supplied with power when the determination unit (23) determines that the at least one piece of identification information stored in the device memory (24) of the power tool body (11) includes the identification information stored in the battery pack memory (33).

The invention claimed is:

1. A power tool system comprising:
a battery pack;
a charger connectable to the battery pack; and
a power tool body connectable to the battery pack, wherein
the battery pack includes a battery pack memory that stores identification information in a smallest unit allowing for communication with the charger and the power tool body, wherein the identification information is associated with a type of the battery pack,
each of the charger and the power tool body includes a device memory that stores at least one piece of identification information of a usable battery pack, and
each of the charger and the power tool body or the battery pack includes a determination unit that determines whether or not the at least one piece of identification information stored in the device memory includes the identification information stored in the battery pack memory.

2. The power tool system according to claim 1, wherein the charger includes a charging permission unit that permits charging of the battery pack when the determination unit determines that the at least one piece of identification information stored in the device memory of the charger includes the identification information stored in the battery pack memory.

3. The power tool system according to claim 1, wherein the battery pack includes a charging permission unit that permits charging of the battery pack when the determination unit determines that the at least one piece of identification information stored in the device memory of the charger includes the identification information stored in the battery pack memory.

4. The power tool system according to claim 1, wherein the power tool body includes a power supplying permission unit that permits the power tool body to be supplied with power when the determination unit determines that the at least one piece of identification information stored in the device memory of the power tool body includes the identification information stored in the battery pack memory.

5. The power tool system according to claim 1, wherein the battery pack includes a power supplying permission unit that permits the power tool body to be supplied with power when the determination unit determines that the at least one piece of identification information stored in the device memory of the power tool body includes the identification information stored in the battery pack memory.

* * * * *